United States Patent [19]

Irving et al.

[11] 4,439,291

[45] Mar. 27, 1984

[54] ACRYLATE-CONTAINING COMPOSITIONS AND THEIR POLYMERIZATION

[75] Inventors: Edward Irving, Burwell; George E. Green, Stapleford, both of England

[73] Assignee: Ciba-Geigy Corporation, Ardsley, N.Y.

[21] Appl. No.: 400,784

[22] Filed: Jul. 22, 1982

Related U.S. Application Data

[63] Continuation of Ser. No. 214,920, Dec. 10, 1980, abandoned.

[30] Foreign Application Priority Data

Dec. 22, 1979 [GB] United Kingdom ............... 7944319
Apr. 22, 1980 [GB] United Kingdom ............... 8013262

[51] Int. Cl.$^3$ .................... C08F 2/50; C08G 75/04
[52] U.S. Cl. .................... 204/159.23; 204/159.11; 525/502; 525/922; 526/313; 526/316; 526/320; 430/287; 528/128; 528/173; 528/187; 528/192; 528/205
[58] Field of Search ............... 525/922, 502; 526/313, 526/316, 320; 204/159.11, 159.23

[56] References Cited

U.S. PATENT DOCUMENTS

| | | | |
|---|---|---|---|
| 3,173,893 | 3/1965 | Fertig et al. | 526/313 |
| 4,008,341 | 2/1977 | Kehr | 427/44 |
| 4,082,891 | 4/1978 | Curry et al. | 204/159.15 |
| 4,245,031 | 1/1981 | Chambers | 204/159.13 |
| 4,272,586 | 6/1981 | Ando et al. | 204/159.13 |
| 4,294,920 | 10/1981 | Helling et al. | 430/569 |
| 4,310,650 | 1/1982 | Gupta et al. | 526/313 |
| 4,310,687 | 1/1982 | Barabas et al. | 526/313 |

FOREIGN PATENT DOCUMENTS 2012780  8/1979  United Kingdom .

*Primary Examiner*—John C. Bleutge
*Assistant Examiner*—A. H. Koeckert
*Attorney, Agent, or Firm*—Luther A. R. Hall

[57] ABSTRACT

Polymerizable compositions comprise
(a) a compound containing both
  (i) at least one acryloyloxy or methacryloyloxy group,
  (ii) at least one allyl, methallyl, or 1-propenyl group attached directly to a carbon atom which forms part of an aromatic nucleus or to an oxygen atom or an oxycarbonyl group which are in turn directly attached to such a carbon atom,
  the total of the said groups (i) and (ii) being at least three, and
(b) a compound containing at least two mercaptan groups directly attached to aliphatic carbon atoms, in a proportion as to supply at least 0.8 such mercaptan group per allyl, methallyl or 1-propenyl group in (a) but less than 1.0 such mercaptan group in (a) per acryloyl, methacryloyl, allyl, methallyl, or 1-propenyl group.

Examples of (a) are 2,2-bis(3-allyl-4-(methacryloyloxy)-phenyl)propane, bis(3-methallyl-4-(methacryloyloxy)-phenyl)methane, 2,2-bis(3-allyl-4-(3-(methacryloyloxy)-2-hydroxypropoxy)phenyl)propane, 2,6-dimethallyl-phenyl acrylate, 1-(allyloxycarbonyl)-2,4- and 2,5-bis(3-(methacryloyloxy)-2-hydroxypropoxycarbonyl)benzene, and benzophenone-3,4,3',4'-tetracarboxylic acid X,X'-diallyl esters Y,Y'-bis(3-(methacryloyloxy)-2-hydroxypropyl) esters. Examples of (b) are pentaerythritol tetrathioglycollate, trimethylolpropane trithioglycollate, and 3,6-dioxa-1,8-dimercapto-octane.

The compositions may be polymerized by means of actinic irradiation in the presence of an added or "built-in" photosensitizer or by the action of a free-radical catalyst. Compositions containing both a photosensitizing agent and a heat-activated free-radical catalyst may be subjected to a two-stage process, comprising brief exposure to actinic radiation followed by, when desired, heating. They are useful in the production of surface coatings, adhesive bonds, and of reinforced composites.

14 Claims, No Drawings

ACRYLATE-CONTAINING COMPOSITIONS AND THEIR POLYMERIZATION

This is a continuation of application Ser. No. 214,920, filed on Dec. 10, 1980, now abandoned.

BACKGROUND OF THE INVENTION

This invention relates to compositions comprising a polymercaptan which has at least two mercaptan (—SH) groups and a compound which has at least three ethylenically-unsaturated double bonds. It also relates to the polymerisation of such compositions by means of actinic radiation and/or heat-activated free-radical catalysts, and to the use of the polymerised products as surface coatings, in printing plates and printed circuits, as adhesives, and in reinforced composites.

In published British Patent Application No. 2 012 780 A (U.S. Pat. No. 4,220,513) are described compositions comprising (i) a compound containing in the same molecule both at least one 1,2-epoxide group and at least two groups chosen from allyl, methallyl, and 1-propenyl groups, e.g., 2,2-bis(3-allyl-4-(glycidyloxy)phenyl)propane and bis(3-(1-propenyl)-4-(glycidyloxy)phenyl)methane, and (ii) a compound containing at least two mercaptan groups attached to aliphatic carbon atoms per molecule, e.g., pentaerythritol tetrathioglycollate.

The compositions are caused to polymerise by the reaction of mercaptan groups with the allyl, methallyl or 1-propenyl groups under the influence of actinic radiation or free-radical catalysts.

Such compositions which further contain (iii) a heat-curing crosslinking agent for polyepoxides are also described; the polymerised products, containing more than one epoxide groups per average molecule, could thus be subsequently crosslinked in situ.

Published British Patent Application No. 2 012 781 (U.S. Pat. No. 4,308,367) discloses similar compositions, in which component (i) contains at least one phenolic hydroxyl group instead of at least one epoxide group, e.g., 2,2-bis(3-allyl-4-hydroxyphenyl)propane and bis(3-(1-propenyl)-4-hydroxyphenyl)methane, component (iii) being correspondingly a heat-activated crosslinking agent for phenol-aldehyde novolac resins. The polymerised products, containing more than one phenolic hydroxyl group per average molecule, could likewise be subsequently crosslinked in situ by heating.

We have now found that certain compounds containing acrylate or methacrylate ester groups can be caused to polymerise very rapidly by exposure to radiation or to the action of free-radical catalysts in the presence of certain mercaptans to form products having valuable properties. The acrylate or methacrylate esters employed also contain allyl, methallyl, and/or 1-propenyl groups. It is believed, although the usefulness of this invention does not depend on the truth of this belief, that the allylic type double bonds react preferentially with the mercaptan groups, thus facilitating the polymer-forming processes taking place by means of the double bonds in the acrylic or methacrylic groups. Whatever the mechanisms of the reactions may be, it has been found that the compositions polymerise rapidly to form surface coatings and adhesive bonds characterised by good resistance to deleterious environments such as hot humid conditions.

SUMMARY OF THE INVENTION

One aspect of this invention accordingly provides polymerisable compositions comprising (a) a compound containing in the molecule both
  (i) at least one group selected from acryloyloxy and methacryloyloxy groups,
  (ii) at least one group selected from allyl, methallyl, and 1-propenyl groups each of which is attached directly to a carbon atom which forms part of an aromatic nucleus or to an oxygen atom or an oxycarbonyl group (—OOC—) which are in turn directly attached to such a carbon atom, the total of the said groups (i) and (ii) being at least three, (b) a compound containing, per molecule, at least two mercaptan groups directly attached to aliphatic carbon atoms, in a proportion as to supply at least 0.8 such mercaptan group per group selected from allyl, methallyl and 1-propenyl groups in (a) but less than 1.0 such mercaptan group per group selected from acryloyl, methacryloyl, allyl, methallyl, and 1-propenyl groups in (a).

Other aspects of this invention include a process for the polymerisation of such compositions, comprising exposing them to actinic radiation or to the effect of a free-radical catalyst, and the polymerised products obtained by such a process.

U.S. Pat. No. 4,120,721 describes radiation-curable compositions for use in coating and image-forming processes. The compositions comprise a polyunsaturated acrylic or methacrylic-terminated urethane, a vinyl monomer which is preferably an ester of acrylic or methacrylic acid, a polymercaptan containing at least two —SH groups per molecule, and a photoinitiator. To obtain the acrylic or methacrylic-terminated polyurethane, a di-isocyanate is caused to react with an hydroxy-substituted acrylate or methacrylate in an amount such that one stoichiometric equivalent of free isocyanate groups remains in the reaction product, then these isocyanate groups are caused to react with the stoichiometric equivalent of hydroxyl groups in a polyhydric alcohol, preferably a polyethylene glycol or a polypropylene glycol. In addition to approximately fifty hydroxyalkyl acrylates and methacrylates listed as suitable are 2-hydroxy-3-(allyloxy)propyl acrylate, 2-hydroxy-3-cinnamylpropyl acrylate, 2-hydroxy-3-(crotonyloxy)propyl acrylate, and the corresponding methacrylates. The polymers specifically described were made from a hydroxyalkyl acrylate or hydroxyalkyl methacrylate and lacked allylic-type double bonds. There is no suggestion that the use of acrylic or methacrylic-terminated urethanes derived from hydroxyalkyl acrylates which contain additional ethylenic unsaturation confers any advantage.

DESCRIPTION OF THE PREFERRED EMBODIMENTS

In the compositions of this invention component (a) preferably contains no ethylenic unsaturation other than in acryloyloxy, methacryloyloxy, allyl, methallyl, and 1-propenyl groups. It preferably has a molecular weight of at most 5000. Preferably, the or each acryloyloxy or methacryloyloxy group is attached to a carbon atom of an aromatic nucleus, directly or through the (terminal) ether oxygen atom of a group of formula

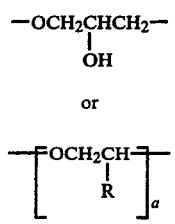

where
R denotes a hydrogen atom or a methyl group and
a is an integer of from 1 to 6.

Preferably component (a) contains at least two and at most six groups chosen from acryloyloxy and methacryloyloxy groups per molecule, and preferably it contains at least two and at most fifteen groups chosen from allyl, methallyl, and 1-propenyl groups per molecule.

Yet further preferred as component (a) are compounds in which the total number of groups chosen from acryloyloxy and methacryloyloxy groups per molecule is the same as the total number in that molecule of groups chosen from allyl, methallyl, and 1-propenyl groups.

The or each aromatic nucleus in component (a) is preferably a benzene nucleus or a naphthalene nucleus.

Further preferred as component (a) are polyhydric phenols, at least two phenolic hydroxyl groups of which are esterified with acryloyl or methacryloyl groups, either directly or through the (terminal) ether oxygen atom of a group of formula I or II, and at least two phenolic hydroxyl groups of which are directly etherified with groups chosen from allyl, methallyl, and 1-propenyl groups.

Particularly preferred as component (a) are polyhydric phenols, at least two phenolic hydroxyl groups of which are esterified with groups chosen from acryloyl and methacryloyl groups, either directly or through the (terminal) ether oxygen atom of a group of formula I or II aforesaid, the polyhydric phenol being substituted directly on carbon atoms in the benzene or naphthalene nucleus or nuclei by at least two groups chosen from allyl, methallyl, and 1-propenyl groups, especially such compounds where these groups are ortho to the said acryloyl or methacryloyl groups.

Examples of compounds suitable as component (a) are those of the following formulae:

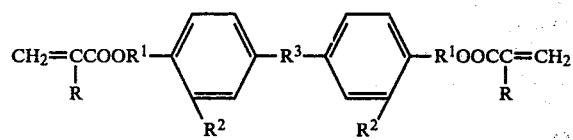

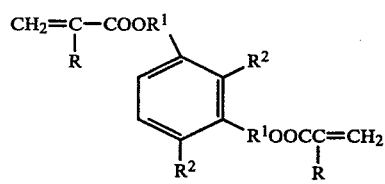

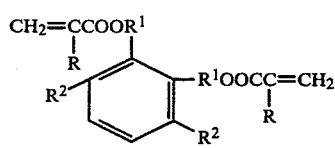

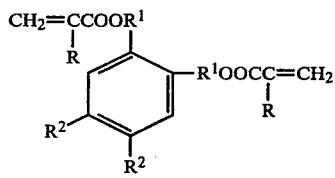

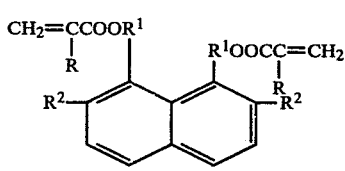

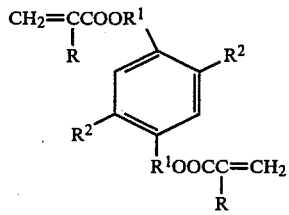

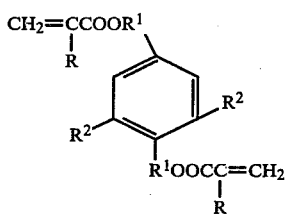

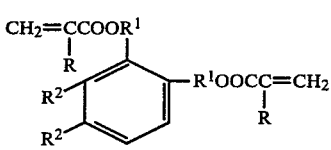

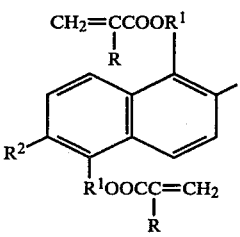

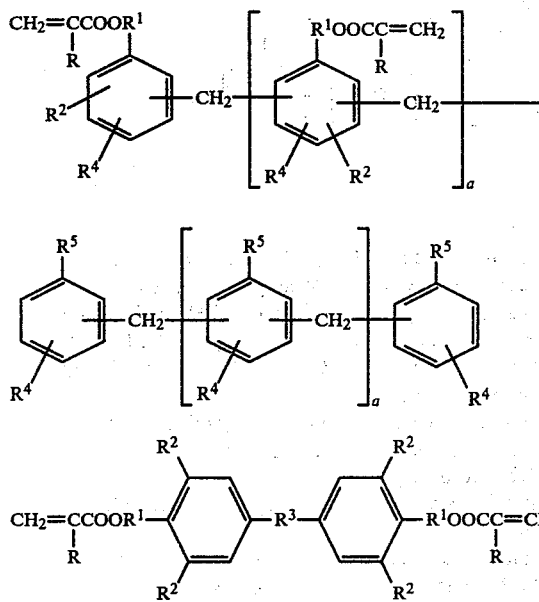

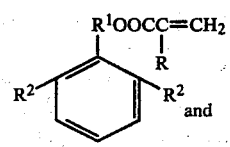

where
R and a have the meanings assigned in formula II,
each $R^1$ denotes an oxygen-carbon bond or a group of formula I or II as defined above,
each $R^2$ denotes an allyl, methallyl, or 1-propenyl group,
$R^3$ denotes a carbon-carbon bond, an alkylene or alkylidene group of up to 5 carbon atoms, an ether oxygen atom, a sulfur atom, or a group of formula —CO—, —SS—, —SO—, or —SO$_2$—,
each $R^4$ denotes a hydrogen, chlorine, or bromine atom, or an alkyl group of 1 to 4 carbon atoms, and
each $R^5$ denotes a group of formula $CH_2$=C(R)COOR$^1$— or an allyloxy, methallyloxy, or 1-propenyloxy group such that at least one denotes a said group of formula $CH_2$=C(R)COOR$^1$— and at least two each denote an allyloxy, methallyloxy, or 1-propenyloxy group,
with the proviso that, in formulae XII and XIII, each —CH$_2$— and R$^2$— group shown is ortho or para to an indicated group $CH_2$=C(R)COOR$^1$— and R$^5$—.

Specific examples of compounds suitable as component (a) are:
2,2-bis(3-allyl-4-(methacryloyloxy)phenyl)propane, bis(3-allyl-4-(methacryloyloxy)phenyl)methane, 2,2-bis(3-methallyl-4-(methacryloyloxy)phenyl)propane, bis(3-methallyl-4-(methacryloyloxy)phenyl)methane, 2,2-bis(3-(1-propenyl)-4-(methacryloyloxy)phenyl)propane, bis(3-(1-propenyl)-4-(methacryloyloxy)phenyl)methane, and their acryloyl analogues:
2,2-bis(3-allyl-4-(3-(methacryloyloxy)-2-hydroxypropoxy)phenyl)propane, bis(3-allyl-4-(3-(methacryloyloxy)-2-hydroxypropoxy)phenyl)methane, 2,2-bis(3-methallyl-4-(3-(methacryloyloxy)-2-hydroxypropoxy)phenyl)propane, bis(3-methallyl-4-(3-(methacryloyloxy)-2-hydroxypropoxy)phenyl)methane, 2,2-bis(3-(1-propenyl)-4-(3-(methacryloyloxy)-2-hydroxypropoxy)phenyl)propane, bis(3-(1-propenyl)-4-(3-(methacryloyloxy)-2-hydroxypropoxy)phenyl)methane, and their acryloyl analogues:
2,2-bis(3-allyl-4-(2-(methacryloyloxy)ethoxy)phenyl)propane, bis(3-allyl-4-(2-(methacryloyloxy)ethoxy)phenyl)methane, 2,2-bis(3-methallyl-4-(2-(methacryloyloxy)ethoxy)phenyl)propane, bis(3-methallyl-4-(2-(methacryloyloxy)ethoxy)phenyl)methane, 2,2-bis(3-(1-propenyl)-4-(2-(methacryloyloxy)ethoxy)phenyl)propane, bis(3-(1-propenyl)-4-(2-(methacryloyloxy)ethoxy)phenyl)methane, and their acryloyl analogues:
2,2-bis(3-allyl-4-(2-(methacryloyloxy)-2-methylethoxy)phenyl)propane, bis(3-allyl-4-(2-(methacryloyloxy)-2-methylethoxy)phenyl)methane, 2,2-bis(3-methallyl-4-(2-(methacryloyloxy)-2-methylethoxy)phenyl)propane, bis(3-methallyl-4-(2-(methacryloyloxy)-2-methylethoxy)phenyl)methane, 2,2-bis(3-(1-propenyl)4-(2-(methacryloyloxy)-2-methylethoxy)phenyl)propane, bis(3-(1-propenyl)-4-(2-(methacryloyloxy)-2-methylethoxy)phenyl)methane, and their acryloyl analogues:
2,6-diallylphenyl acrylate 2,6-diallylphenyl methacrylate, 2,6-dimethallylphenyl acrylate, 2,6-dimethallylphenyl methacrylate, 2,6-di(1-propenyl)phenyl acrylate, 2,6-di(1-propenyl)phenyl methacrylate,
1,3-diallyl-2-(2-hydroxy-3-(methacryloyloxy)propoxy)benzene, 1,3-dimethallyl-2-(2-hydroxy-3-(methacryloyloxy)propoxy)benzene, 1,3-di(1-propenyl)-2-(2-hydroxy-3-(methacryloyloxy)propoxy)benzene, and their acryloyl analogues:
1,3-diallyl-2-(2-(methacryloyloxy)ethoxy)benzene, 1,3-dimethallyl-2-(2-methacryloyloxy)ethoxy)benzene, 1,3-di(1-propenyl)-2-(2-(methacryloyloxy)ethoxy)benzene, and their acryloyl analogues;
1,3-diallyl-2-(2-(methacryloyloxy)-2-methylethoxy)-benzene, 1,3-dimethallyl-2-(2-(methacryloyloxy)-2-methylethoxy)benzene, 1,3-di(1-propenyl)-2-(2-(methacryloyloxy)-2-methylethoxy)benzene, and their acryloyl analogues;
2,2-bis(3,5-diallyl-4-(methacryloyloxy)phenyl)propane, bis(3,5-diallyl-4-(methacryloyloxy)phenyl)methane, 2,2-bis(3,5-dimethallyl-4-(methacryloyloxy)phenyl)propane, bis(3,5-dimethallyl-4-(methacryloyloxy)phenyl)methane, 2,2-bis(3,5-di(1-propenyl)-4-(methacryloyloxy)phenyl)propane, bis(3,5-di(1-propenyl)-4-(methacryloyloxy)phenyl)methane, and their acryloyl analogues;

2,2-bis(3,5-diallyl-4-(3-(methacryloyloxy)-2-hydroxypropoxy)propane, bis(3,5-diallyl-4-(3-(methacryloyloxy)-2-hydroxypropoxy)phenyl)methane, 2,2-bis(3,5-dimethallyl-4-(3-methacryloyloxy)-2-hydroxypropoxy)phenyl)propane, bis(3,5-dimethallyl-4-(3-(methacryloyloxy)-2-hydroxypropoxy)phenyl)methane, 2,2-bis(3,5-di(1-propenyl)-4-(3-(methacryloyloxy)-2-hydroxypropoxy)phenyl)propane, and bis(3,5-di(1-propenyl)-4-(3-(methacryloyloxy)-2-hydroxypropoxy)phenyl)methane, and their acryloyl analogues.

Other compounds which may be used as component (a) contain two acryloyloxy or methacryloyloxy groups and only one allyl, methallyl, or 1-propenyl group per molecule. The latter group may be attached to an oxycarbonyl group which is in turn directly attached to a carbon atom which forms part of an aromatic nucleus, as in those of formula

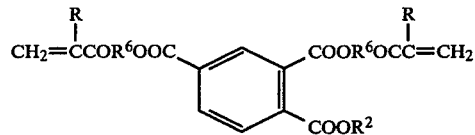

XVI

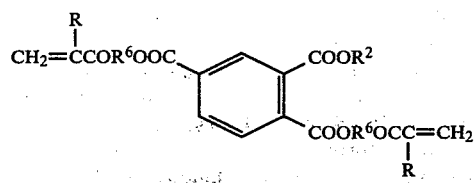

XVII where each $R^6$ denotes a group of formula I or II.

Specific examples of compounds of formula XVI or XVII are:

1-(allyloxycarbonyl)-2,4-bis(3-(methacryloyloxy)-2-hydroxypropoxycarbonyl)benzene, 1-(allyloxycarbonyl)-2,5-bis(3-(methacryloyloxy)-2-hydroxypropoxycarbonyl)benzene, 1-(allyloxycarbonyl)-2,4-bis(methacryloyloxycarbonyl)benzene, 1-(allyloxycarbonyl)-2,5-bis(methacryloyloxycarbonyl)benzene, 1-(methallyloxycarbonyl)-2,4-bis(3-(methacryloyloxy)-2-hydroxypropoxycarbonyl)benzene, 1-(methallyloxycarbonyl)-2,5-bis(3-(methacryloyloxy)-2-hydroxypropoxycarbonyl)benzene, 1-(methallyloxycarbonyl)-2,4-bis(methacryloyloxycarbonyl)benzene, 1-(methallyloxycarbonyl)-2,5-bis(methacryloyloxycarbonyl)benzene, 1-(1-propenyloxycarbonyl)-2,4-bis(3-methacryloyloxy)-2-hydroxypropoxycarbonyl)benzene, 1-(1-propenyloxycarbonyl)-2,5-bis(3-(methacryloyloxy)-2-hydroxypropoxycarbonyl)benzene, 1-(1-propenyloxycarbonyl)-2,4-bis(methacryloyloxycarbonyl)benzene, 1-(1-propenyloxycarbonyl)-2,5-bis(methacryloyloxycarbonyl)benzene, and the corresponding acryloyloxy compounds.

Other compounds which contain two acryloyloxy or methacryloyloxy groups and only one allyl, methallyl, or 1-propenyl group per molecule are those of formula

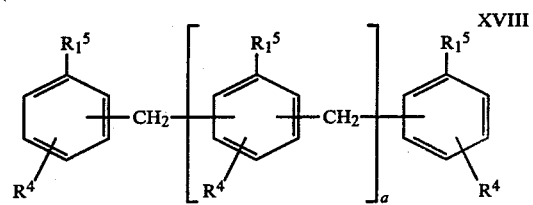

XVIII where
each $R_1^5$ denotes $CH_2=C(R)COOR^1$— or allyloxy, methallyloxy, or 1-propenyloxy, at least two denoting a said group of formula $CH_2=C(R)COOR^1$— and one denoting an allyloxy, methallyloxy, or 1-propenyloxy group, the —$CH_2$— groups being ortho or para to a group —$R_1^5$,
R and a have the meanings assigned in formula I,
$R^1$ has the meaning assigned in formulae III to XII, XIV, and XV,
and $R^4$ has the meaning assigned in formulae XII and XIII.

There may also be used as component (a) products which contain six or more, e.g., twelve, allyl, methallyl, or 1-propenyl groups per molecule and which may be obtained by processes involving advancement. For example, a diglycidyl ether of a dihydric phenol which is substituted in the aromatic nucleus or nuclei by one or more allyl, methallyl, or 1-propenyl groups may be advanced with a dihydric phenol, a dihydric alcohol, a dicarboxylic acid, or a hydantoin having two free —NH— groups in the hydantoin ring or rings. The advanced product is then caused to react, at the secondary hydroxyl groups so formed, with glycidyl acrylate or glycidyl methacrylate, or with acryloyl chloride or methacryloyl chloride.

Other advanced products containing six or more allyl, methallyl, or 1-propenyl groups may be obtained by advancement of diglycidyl ethers of dihydric phenols, diglycidyl ethers of dihydric alcohols, or di(N-glycidyl)hydantoins such as 1,3-diglycidylhydantoin and 3,3'-diglycidyl-1,1'-methylenebis(hydantoin) with a dihydric phenol substituted in the aromatic nucleus or nuclei by one or more allyl, methallyl, or 1-propenyl groups, followed by reaction at the secondary hydroxyl groups so generated with glycidyl acrylate, glycidyl methacrylate, acryloyl chloride, or methacrylate chloride.

There may also be used as component (a) benzophenone derivatives of the formula

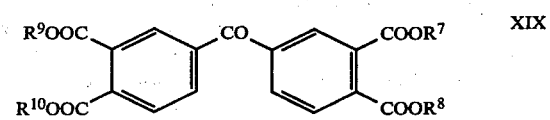

XIX where
one of $R^7$ and $R^8$, and one of $R^9$ and $R^{10}$, have the same meaning and each denotes as allyl or methallyl group, and
each of the remaining symbols of $R^7$ and $R^8$, and of $R^9$ and $R^{10}$, denotes the residue of an alcohol, after removal of the hydrogen atom of an alcoholic hydroxyl group, said residue containing an acryloyloxy or methacryloyloxy group, especially as an acryloyloxyalkenoxy, methacryloyloxyalkyleneoxy, acryloyloxyhydroxyalkyleneoxy or methacryloyloxyhydroxyalkyleneoxy group.

Preferably each of the remaining symbols of $R^7$ and $R^8$, and of $R^9$ and $R^{10}$, represents a group of formula $$CH_2=\underset{R}{C}COR^6- \qquad XX$$

where R has the meaning assigned in formula I and $R^6$ has the meaning assigned in formulae XVI and XVII.

Most previously known substances which polymerise on exposure to actinic radiation are used with a photoinitiator such as benzoin and its alkyl ethers to shorten the exposure time required for polymerisation. However, sometimes the use of an initiator is inconvenient. Thus, it may alter the electrical properties of the polymer. It may volatilise on being heated, so making it unsuitable for use in multilayer printed circuits; hence, in their preparation, the polymer must be removed after a metal etching process has taken place, which removal adds to the cost of the laminates and may cause damage to the surface of the metal.

It is well known to prepare photopolymerisable substances containing a residue of certain olefinically-unsaturated monocarboxylic acids, especially acryloyloxy, methacryloyloxy, sorboyloxy, cinnamoyloxy, or 3-(2-furyl)acryloyloxy groups, which are generally employed with a photoinitiator such as those aforesaid. In British Patent Specification No. 1,464,287 it is disclosed that addition of a photoinitiator can be avoided by incorporating chalcone or chalcone-like groups into a molecule of a compound having such a residue of an olefinically-unsaturated monocarboxylic acid.

Recently, photopolymerisable photosensitising compounds have been described (British published Patent Application No. 2,015,518A) which are prepared by addition of an alkylene oxide to the phenolic hydroxyl group or groups of a hydroxyl-substituted benzophenone, followed by esterification with an unsaturated carboxylic acid such as acrylic acid or reaction with glycidyl acrylate. Others have been prepared (see West German Offenlegungschrift 2 800 356) by reaction of a compound containing more than one 1,2-epoxide group with a stoichiometric deficit of ammonia and/or an aliphatic or cycloaliphatic primary and/or secondary amine, then with a carboxyl-substituted benzophenone, and lastly with acrylic acid or methacrylic acid.

It is also known that olefinically-unsaturated compounds, for example, those containing allyl groups, undergo an addition reaction at the ethylenic double bonds with polymercaptans, which reaction may be initiated by actinic radiation (see, e.g., British Patent Specifications Nos. 1,215,591, 1,251,232, 1,445,814, and published British Patent Applications Nos. 2,012,780A and 2,012,781A). It is usually necessary to employ a photoinitiator with such mixtures of polymercaptans and olefinically-unsaturated compounds.

We have found that the use of an additional photoiniator can be avoided by employment, as component (a), of compounds of formula IIX.

Specific examples of compounds of formula XIX are benzophenone-3,4,3',4'-tetracarboxylic acid X',X'-diallyl esters Y,Y'-bis(3-methacryloyloxy)-2-hydroxypropyl) esters. (The use of the designations X,X',Y, and Y' is explained below).

The compounds used as component (a) in the compositions of this invention are believed to be new.

Compounds of formulae III to XI where each $R^1$ denotes an oxygen-carbon bond and each $R^2$ denotes allyl or methallyl are obtainable by conversion of the corresponding dihydric phenols into their diallyl or dimethallyl ethers followed by a Claisen rearrangement to give the diallylphenol or dimethallylphenol, then esterifying the liberated phenolic hydroxyl groups directly with acryloyl or methacryloyl chloride.

Compounds of formulae III to XI where each $R^1$ denotes a group of formula I and each $R^2$ denotes allyl or methyl are obtainable by conversion of the aforesaid diallylphenols or dimethallylphenols into their glycidyl ethers and opening of the epoxide groups through reaction of these with acrylic or methacrylic acid. Alternatively, they may be obtained by the corresponding reactions of the aforesaid diallylphenols or dimethallylphenols with glycidyl acrylate or glycidyl methacrylate.

Compounds of formula III to XI where each $R^1$ denotes a group of formula II and each $R^2$ denotes allyl or methallyl are obtainable by etherification of the aforesaid diallylphenols or dimethallylphenols with 1 to 6 mol. of ethylene oxide or propylene oxide per phenolic hydroxyl group, followed by esterification with acryloyl chloride or methacryloyl chloride.

Compounds of formula XII where each $R^1$ denotes an oxygen-carbon bond and each $R^2$ denotes allyl or methallyl are obtainable by conversion of a corresponding phenol-formaldehyde novolac into its tri- or higher allyl or methallyl ether, subjection to a Claisen rearrangement to form the allyl or methallyl-substituted novolac, and then esterification of liberated phenolic hydroxyl groups with acryloyl chloride or methacryloyl chloride.

Compounds of formula XII where each $R^1$ denotes a group of formula I and each $R^2$ denotes allyl or methallyl are obtainable by conversion of the aforesaid allyl or methallyl-substituted novolacs into their glycidyl ethers and opening of the epoxide groups through reaction of these with acrylic or methacrylic acid. Alternatively, they may be obtained by the reaction of the aforesaid allyl or methallyl-substituted novolacs with glycidyl acrylate or glycidyl methacrylate.

Compounds of formula XII where each $R^1$ denotes a group of formula II and each $R^2$ denotes allyl or methallyl are obtainable by etherification of the aforesaid allyl or methallyl-substituted novolacs with 1 to 6 mol. of ethylene oxide or propylene oxide per phenolic hydroxyl group followed by esterification with acryloyl chloride or methacryloyl chloride.

Compounds of formula XIII where each $R^1$ in the group or groups $CH_2=C(R)COOR^1-$ denotes an oxygen-carbon bond and at least two groups $R^5$ each denote allyloxy or methallyloxy are obtainable by, in either order, partial etherification with allyl or methallyl groups of phenolic hydroxyl groups in a phenol-formaldehyde novolac and partial esterification of phenolic hydroxyl groups therein with acryloyl chloride or methacryloyl chloride.

Compounds of formula XIII where each $R^1$ in the group or groups $CH_2=C(R)COOR^1-$ denotes a group of formula I and at least two groups $R^5$ each denote allyloxy or methallyloxy are obtainable by, in either order, conversion of phenolic hydroxyl groups in a phenol-formaldehyde novolac into glycidyl groups and reaction thereof with acrylic or methacrylic acid, and etherification of at least two phenolic hydroxyl groups with allyl chloride or methallyl chloride. Alternatively, at least one phenolic hydroxy group may be caused to react with glycidyl acrylate or glycidyl methacrylate before or after conversion of at least two of the phenolic hydroxyl groups by means of allyl chloride or methallyl chloride into allyl or methallyl groups.

Compounds of formula XIII where each $R^1$ in the group or groups $CH_2=C(R)COOR^1$— denotes a group of formula II and at least two groups $R^5$ each denote allyloxy or methallyloxy are obtainable by etherification of at least two phenolic hydroxyl groups with allyl chloride or methallyl chloride, reaction of one or more residual phenolic hydroxyl groups with ethylene oxide or propylene oxide, and esterification with acryloyl chloride or methacryloyl chloride.

Compounds of formulae XVI are obtained in an analogous manner to those of formula XIII.

Compounds of formula XIV and XV where the or each $R^1$ denotes an oxygen-carbon bond and each $R^2$ denotes allyl or methallyl are obtainable by etherification of the phenolic hydroxyl group in phenol itself or of both phenolic hydroxyl groups in the appropriate dihydric phenol by an allyl or methallyl group or groups, followed by a Claisen rearrangement, re-etherification of the phenolic hydroxyl group or groups so liberated with an allyl or methallyl group or groups, a further Claisen rearrangement to yield the diallyl or dimethallylphenol or the tetra-allyl or tetramethallyl bisphenol, and esterification of the phenolic hydroxyl group or groups with acryloyl or methacryloyl chloride.

Compounds of formulae XIV and XV where the or each $R^1$ denotes a group of formula I and each $R^2$ denotes allyl or methallyl are obtainable by conversion of the phenolic hydroxyl group in the diallyl or dimethallylphenol or both phenolic hydroxyl groups in the tetra-allyl or tetramethallylbisphenol into a glycidyl ether group or groups followed by reaction with acrylic or methacrylic acid. Alternatively, the diallyl or dimethallylphenol or the tetra-allyl or tetramethallylbisphenol may be caused to react with, correspondingly, one or two mols. of glycidyl acrylate or glycidyl methacrylate.

Compounds of formula XIV and XV where the or each $R^1$ denotes a group of formula II and each $R^2$ denotes allyl or methallyl are obtainable by etherification of the phenolic hydroxyl group or group in the aforesaid diallyl or dimethallylphenol or tetra-allyl or tetramethallylbisphenol with 1 to 6 mol. of ethylene oxide or propylene oxide per phenolic hydroxyl group followed by esterification with acryloyl chloride or methacryloyl chloride.

Compounds of formulae III to XV where each $R^2$ denotes a 1-propenyl group may be prepared from their allyl analogues by isomerisation through heating with an alkali.

The formation of allyl and methallyl ethers of monohydric and polyhydric phenols and their Claisen rearrangement is described in published British Patent Applications Nos. 2,012,780 A and 2,012,781 A, including the preparation of 2,6-diallylphenols, 2,6-dimethallylphenols, 2,2',6,6'-tetra-allylbisphenols and 2,2',6,6'-tetramethallylbisphenols, and also the conversion of allylphenols into their glycidyl ethers. The isomerisation of aryl allyl ethers into aryl 1-propenyl ethers is also described in these Applications.

Methods of reacting phenols with ethylene oxide or propylene oxide to give the corresponding phenoxyalkanols are well known, as are the esterification of phenols or phenoxyalkanols with acryloyl chloride or methacryloyl chloride, the reaction of glycidyl ethers of phenols with acrylic or methacrylic acid, and the reaction of phenols with glycidyl acrylate or glycidyl methacrylate.

Compounds of formula XVI and XVII may be made by reaction of trimellitic anhydride with allyl or methallyl alcohol and isomerising the allyl group if required, to give the mixed isomers of formula

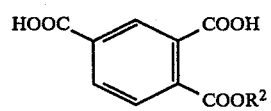

XXI and

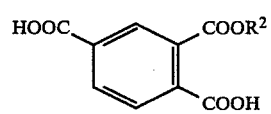

XXII

The compounds of formula XXI or XXII may then be caused to react with glycidyl acrylate or glycidyl methacrylate in a manner known per se to afford the products of formula XVI or XVII where $R^6$ denotes a group of formula I. The same products may alternatively be obtained by converting the dicarboxylic acids of formula XXI or XXII into their diglycidyl esters and opening the epoxide groups in a manner known per se with acrylic acid or methacrylic acid.

The compounds of formula XXI or XXII may also be treated with 1 to 6 molar proportions of ethylene oxide or propylene oxide and then the resulting adducts esterified with acrylic acid or methacrylic acid to give the products of formula XVI or XVII where $R^6$ denotes a group of formula II.

Compounds of formula XIX may be readily prepared from benzophenone-3,4,3',4'-tetracarboxylic acid dianhydride, which is commercially available. Thus, on heating this dianhydride with allyl alcohol or methallyl alcohol there are afforded the compounds of formula XIX where one of $R^7$ and $R^8$, and one of $R^9$ and $R^{10}$, each denotes an allyl or methallyl group and the remaining symbols each denote a hydrogen atom, i.e., benzophenone-3,4,3',4'-tetracarboxylic acid X,X'-diallyl esters and the corresponding X,X'-dimethallyl esters. (Direct esterification to give the 3,4,3',4'-tetra-allyl or tetramethallyl ester is not normally feasible.)

It is considered that the products comprise the three possible isomers, viz., respectively, the 3,3'-dicarboxy-4,4'-bis(allyloxycarbonyl), the 4,4-dicarboxy-3,3'-bis(allyloxycarbonyl), and the 3,4'-dicarboxy-3',4-bis(allyloxycarbonyl) derivatives of benzophenone, and, where methallyl alcohol is employed, their methallyl homologues. However, the utility of this invention does not depend on the truth of this belief.

Reaction of these diester-dicarboxylic acids with epichlorohydrin followed by dehydrochlorination, in a known manner for the production of glycidyl esters from carboxylic acids, yields benzophenone-3,4,3',4'-tetracarboxylic acid X,X'-diallyl esters Y,Y'-diglycidyl esters and the corresponding methally compounds.

Reaction of benzophenone-3,3',4,4'-tetracarboxylic acid X,X'-diallyl esters Y,Y'-diglycidyl esters with acrylic acid or with methacrylic acid gives the X,X'-diallyl Y,Y'-bis(3-(acryloyloxy)-2-hydroxypropyl) tetra-esters or the corresponding X,X'-diallyl Y,Y'-bis(3-(methacryloyloxy)-2-hydroxypropyl) tetra-esters, i.e., the compounds of formula XIX where one of $R^7$ and $R^8$ and one of $R^9$ and $R^{10}$ each denotes an allyl group and the remaining symbols of $R^7$ and $R^8$, and $R^9$ and $R^{10}$, each denote a group of formula XX. Methods for the reaction of glycidyl ester groups with acrylic acid and methacrylic acid are well known. The above mentioned X,X'-diallyl Y,Y'-bis(3-(acryloyloxy)-2-hydroxypropyl) tetra-esters or X,X'-diallyl Y,Y'-bis(3-(methacryloyloxy)-2-hydroxypropyl) tetra-esters may also be obtained by reaction of benzophenone-3,4,3',4'-tetracarboxylic acid X,X'-diallyl esters with 2 molar proportions of glycidyl acrylate or glycidyl methacrylate. The methallyl homologues may be prepared in a similar manner.

Compounds of formula XIX where one of $R^7$ and $R^8$ and one of $R^9$ and $R^{10}$ are each an allyl group and the remaining symbols each denote a group of formula XX, $R^6$ denoting a group of formula II, are obtainable by reaction of benzophenone-3,3',4,4'-tetracarboxylic acid X,X'-diallyl esters with 2 to 6 molar proportions of ethylene oxide or propylene oxide followed by esterification with 2 molar proportions of acryloyl chloride, methacryloyl chloride, acrylic acid, or methacrylic acid.

A wide range of polymercaptans is suitable for use as component (b) in the compositions of this invention. Preferably the mercaptans are free from any allyl, methallyl, 1-propenyl, acryloyl or methacryloyl group, and preferably they have a molecular weight of not more than 3,000. The polymercaptans employed usually contain not more than six mercaptan groups per molecule directly attached to aliphatic carbon atoms.

One class comprises esters of monomercaptanalkylenecarboxylic acids with polyhydric alcohols or of aliphatic monomercaptanmonohydric alcohols with polycarboxylic acids.

Further preferred such esters are of the formula

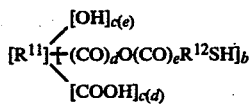  XXIII where
$R^{11}$ represents an aliphatic or araliphatic hydrocarbon radical of from 2 to 60 carbon atoms, which may be interrupted in the chain by not more than one ether oxygen atom,
$R^{12}$ represents an aliphatic hydrocarbon radical, which may be interrupted in the chain by not more than one carbonyloxy group, and is preferably of from 1 to 4 carbon atoms,
b is an integer of from 2 to 6,
c is zero or a positive integer of at most 3, such that (b+c) is at most 6 (terms such as c(d) being construed algebraically), and
d and e each represent zero or 1, but are not the same.

Yet further preferred esters are polymercaptans of formula XXIII which are also of the formula $R^{13}(OCOR^{14}SH)_b$   XXIV where
b has the meaning assigned in formula XXIII,
$R^{13}$ is an aliphatic hydrocarbon radical of from 2 to 10 carbon atoms, and
$R^{14}$ denotes $-(CH_2)-$, $-(CH_2)_2-$, or $-CH(CH_3)-$.

A second class comprises mercaptan-containing esters, including esters of monomercaptandicarboxylic acids, of formula $R^{17}\text{-}[(O)_d\text{--}CO(O)_e\text{--}R^{15}(O)_e\text{--}CO(O)_d\text{--}R^{16}SH]_f$   XXV where
d and e have the meanings assigned in formula XXIII,
f is an integer of from 1 to 6,
$R^{15}$ represents a divalent organic radical, linked through a carbon atom or carbon atoms thereof to the indicated $-O-$ or $-CO-$ units,
$R^{16}$ represents a divalent organic radical, linked through a carbon atom or carbon atoms thereof to the indicated $-SH$ group and $-O-$ or $-CO-$ unit, and
$R^{17}$ represents an organic radical, which must contain at least one aliphatic $-SH$ group when f is 1, linked through a carbon atom or carbon atoms thereof to the indicated adjacent $-O-$ or $-CO-$ unit or units.

When d is zero, $R^{15}$ preferably denotes a saturated aliphatic unbranched hydrocarbon chain of 2 to 20 carbon atoms, which may be substituted by one or more methyl groups and by one or more mercaptan groups and which may be interrupted by one or more ether oxygen atoms and by one or more carbonyloxy groups. When d is 1, $R^{15}$ preferably denotes
(i) a saturated aliphatic hydrocarbon group of 2 to 10 carbon atoms, which may bear a mercaptan group,
(ii) a cycloaliphatic-aliphatic hydrocarbon group of 5 to 34 carbon atoms, which may contain one or more ethylenically-unsaturated double bonds, or
(iii) a mononuclear arylene hydrocarbon group of 6 to 12 carbon atoms.

$R^{16}$ preferably denotes, when d is zero, a saturated aliphatic hydrocarbon group of 1 to 3 carbon atoms, which may bear a carboxyl group, and, when d is 1, it preferably denotes a saturated aliphatic hydrocarbon group of 2 to 4 carbon atoms, which may be substituted by a hydroxyl group or by a chlorine atom.

$R^{17}$ preferably denotes
(iv) an aliphatic or cycloaliphatic-aliphatic hydrocarbon group of 2 to 51 carbon atoms, which may bear at least one aliphatic mercaptan group, or
(v) a mononuclear or dinuclear arylene hydrocarbon group of 6 to 15 carbon atoms, or
(vi) a chain of 4 to 20 carbon atoms, interrupted by at least one ether oxygen atom and optionally substituted by at least one aliphatic mercaptan group, or
(vii) a chain of 6 to 50 carbon atoms, interrupted by at least one carbonyloxy group, optionally interrupted by at least one ether oxygen atom, and optionally substituted by at least one aliphatic mercaptan group.

A third class comprises esters and ethers which are of the general formula

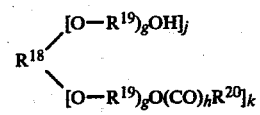   XXVI where
$R^{18}$ represents a radical of a polyhydric alcohol after removal of (j+k) alcoholic hydroxyl groups, especially an aliphatic hydrocarbon radical of from 2 to 10 carbon atoms, each $R^{19}$ denotes an alkylene group containing a chain of at least 2 and at most 6 carbon atoms between the indicated consecutive oxygen atoms, $R^{20}$ represents an aliphatic radical of 1 to 6 carbon atoms containing at least one mercaptan group, g is a positive integer, preferably such that the average molecular weight of the polymercaptan is not more than 2,000, h is zero or 1, j is zero or a positive integer such that (j+k) is at most 6, and k is an integer of from 2 to 6.

The groups $R^{19}$ in individual poly(oxyalkylene) chains may be the same or different and they may be substituted by, e.g., phenyl or chloromethyl groups. Preferably they are —$C_2H_4$— or —$C_3H_6$— groups.

Preferred amongst the compounds of formula XXVI are the esters of formula

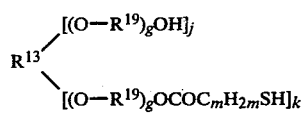

and ethers of formula

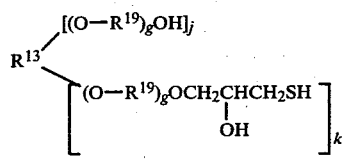

where $R^{13}$ has the meaning assigned in formula XXIV, $R^{19}$, g, j, and k have the meanings assigned in formula XXVI, and m is 1 or 2.

A fourth class of polymercaptans suitable as component (b) are mercaptan-terminated sulfides of the general formula

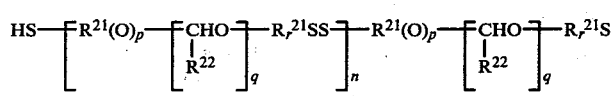

where each $R^{21}$ denotes an alkylene hydrocarbon group containing from 2 to 4 carbon atoms, $R^{22}$ denotes a hydrogen atom or a methyl or ethyl group, n is an integer which has an average value of at least 1, and is preferably such that the average molecular weight of the sulphide is at most 1000, and either p is zero, in which case q and r are each also zero, or p is 1, in which case q is zero or 1 and r is 1.

The preferred sulfides of formula XXIX are those where $R^{22}$ denotes hydrogen and p and q are each 1, n being such that the molecular weight of the sulfides is from 500 to 800.

A fifth class of polymercaptans suitable as component (b) comprises mercaptan-terminated poly(butadienes) of the formula

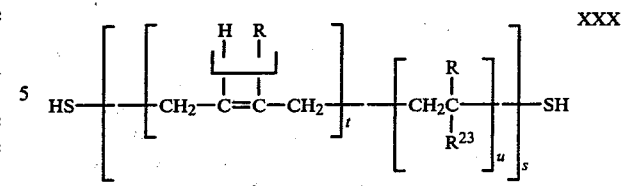

where each R has the meaning assigned in formula II, $R^{23}$ represents —CN, —COOH, —CONH$_2$, —COOR$^{24}$, —C$_6$H$_5$, or —OCOR$^{24}$, where $R^{24}$ is an alkyl group of one to eight carbon atoms, t is an integer of at least one, u is zero or a positive integer, and s is an integer of more than one, preferably such that the average number molecular weight of the polymercaptan is not more than 1000.

Preferably the polymercaptans of formula XXXII are also of the formula

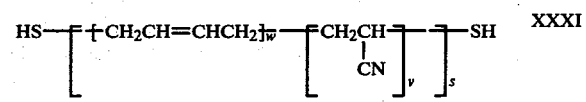

where v is either zero, in which case w is 1, or it is 1, in which case w is an integer of from 2 to 5, and s has the meaning assigned in formula XXX.

A sixth class of polymercaptans for use as component (b) comprises the mercaptan-terminated oxyalkylene compounds of the general formula

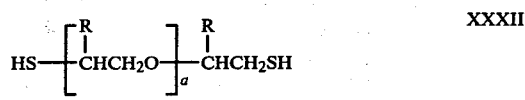

where each R and a have the meaning assigned in formula II.

A seventh class comprises poly(thioglycollates) and poly(mercaptopropionates) of tris(2-hydroxyethyl) isocyanurate and tris(2-hydroxypropyl) isocyanurate, i.e., the compounds of formula

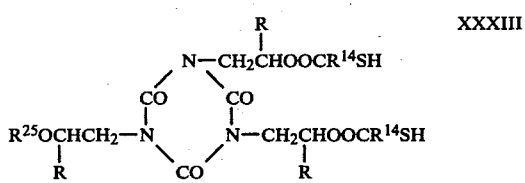

where each R has the meaning assigned in formula I, each $R^{14}$ has the meaning assigned in formula XXIV, and $R^{25}$ denotes a group —OCR$^{14}$SH or a hydrogen atom.

Particularly preferred polymercaptans are poly(thioglycollates) and poly(2- or 3-mercaptopropionates) of aliphatic polyhydric alcohols of 2 to 6 carbon atoms.

In photopolymerising the compositions of this invention, actinic radiation of wavelength 200–600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapor arcs, particularly sun lamps, fluorescent sun lamps, and metal halide lamps are most suitable. The time required for the exposure of the photopolymerisable composition will depend upon a variety of factors which include, for example, the individual compounds used, the type of light source, and its distance from the irradiated composition. Suitable times may be readily determined by those familiar with photopolymerisation techniques.

For photopolymerisation, the compositions (except those containing a compound of formula XIX) contain an added photoinitiator, i.e., a catalyst which, on irradiation, gives an excited state that leads to formation of free radicals which then initiate polymerisation of the composition. Examples of suitable photoinitiators are organic peroxides and hydroperoxides, α-halogen substituted acetophenones such as trichloromethyl 4'-tert. butylphenyl ketone, α-hydroxy-α-alkyl-substituted acetophenones, such as 2-hydroxy-2-methyl-1-phenyl-propan-1-one, benzoin and its alkyl ethers (e.g., the n-butyl ether), α-methylbenzoin, benzophenones such as benzophenone itself and 4,4'-bis(dimethylamino)benzophenone, O-alkoxycarbonyl derivatives of an oxime of benzil or of 1-phenylpropane-1,2-dione, such as benzil (O-ethoxycarbonyl)-α-monoxime and 1-phenylpropane-1,2-dione-2-(O-ethoxycarbonyl)oxime, benzil acetals, e.g., its dimethyl acetal, substituted thioxanthones, e.g., 2-chlorothioxanthone, anthraquinones, and photoredox systems comprising a mixture of a phenothiazine dye (e.g., methylene blue) or a quinoxaline (e.g., a metal salt of 2-(m- or p-methoxyphenyl)quinoxaline-6'- or 7'-sulphonic acid) with an electron donor such benzenesulfinic acid or other sulfinic acid or a salt thereof such as the sodium salt, or an arsine, a phosphine, or thiourea.

Suitable photoinitiators are readily found by routine experimentation. Generally, 0.05 to 10%, and preferably 0.5 to 5%, by weight of the photoinitiator is incorporated, based on the combined weights of the components (a) and (b).

The term "free-radical catalyst" is used herein to refer to substances and does not include actinic radiation. Suitable free-radical catalysts for the polymerisation of the compositions of this invention are heat-activated, i.e., exert an appreciably rapid polymerising effect only at temperatures above normal ambient temperature, and include 2,2'-azobis(2-methylpropionitrile) and organic or inorganic peroxides, e.g., peracids and their salts and esters, such as peracetic acid, perbenzoic acid, perphthalic acid, di-isopropyl peroxydicarbonate, ammonium or an alkali metal perborate, ammonium or an alkali metal persulfate, acyl peroxides such as benzoyl peroxide, and also, e.g., cumyl peroxide, cumene hydroperoxide, hydrogen peroxide, cyclohexanone peroxide, and ethyl methyl ketone peroxide. A tertiary amine, e.g., dimethylaniline, or a cobalt siccative, e.g., cobalt naphthenate, may be used as an accelerator with the peroxides.

The amount of free-radical catalyst, together with any accelerator therefor, is usually from 0.05 to 5%, and preferably 0.1 to 1%, by weight, calculated on the total of the weights of the components (a) and (b). Standard methods of free radical catalyst-induced polymerisation can be employed.

The compositions of this invention may, as already indicated, be used as surface coatings. They may be applied to a substrate such as steel, aluminum, copper, chromium, cadmium, zinc, tin, glass, ceramic, paper, or wood, preferably as a liquid, and photopolymerized, or induced to polymerise by means of the free-radical catalyst. By photopolymerising through irradiation part of the coating, as through a mask, those sections which have not been exposed may be washed with a solvent to remove the unpolymerised portions while leaving the photopolymerised, insoluble sections in place. Thus the compositions of this invention may be used in the production of printing plates and printed circuits. Methods of producing printing plates and printed circuits from photopolymerisable compositions are well known (see, e.g., British Patent Specification No. 1 495 746).

This invention accordingly also provides articles bearing thereon a surface coating comprising a polymerised product produced by a process of this invention.

The compositions of this invention may also be used as adhesives. Employing irradiation to induce polymerisation, a layer of the composition may be sandwiched between two surfaces of objects, at least one of which is transparent to the actinic radiation, e.g., of glass or poly(methyl methacrylate). Suitable other adherends include metals such as iron, zinc, copper, chromium, nickel, aluminum, cadmium, zinc, tin, ceramics, wood, rubbers, and plastics such as acrylic resins. The assembly is then subjected to actinic radiation through at least one surface which is transparent to such radiation. When free-radical catalysts are used to initiate polymerisation, a layer of the compositions containing such a catalyst may be placed between, and in contact with, two surfaces to be joined, and the assembly is heated.

This invention accordingly provides articles having surfaces bonded together by means of a polymerised product made by a process of this invention.

The compositions are also useful in the production of fiber-reinforced composites, including sheet moulding compounds. They may be applied directly, in liquid form, to reinforcing fibers (including strands, filaments, and whiskers), which may be in the form of woven or nonwoven cloth, unidirectional lengths, or chopped strands, especially glass, boron, stainless steel, tungsten, alumina, silicon carbide, asbestos, potassium titanate whiskers, an aromatic polyamide such as poly(m-phenylene isophthalamide), poly(p-phenylene terephthalamide) or poly(p-benzamide), polyethylene, or carbon. The impregnated fibers are then irradiated or the free-radical catalyst is activated.

The compositions of this invention are also useful in the production of putties and fillers, and as dip-coating compositions, an article to be coated being dipped in a liquid composition of this invention and withdrawn, and then irradiated so that the adhering coating polymerises. Alternatively, the composition may be caused to solidify and cure by activating a free-radical catalyst.

We have further found that it is possible to cure the compositions of this invention in two stages: such a composition, containing a heat-activated free-radical catalyst and also a photoinitiator if necessary, may be partly polymerised by exposure to an amount of actinic radiation insufficient to cause complete polymerisation, and then it is heated so that the free-radical catalyst is activated and curing is completed.

Other aspects of this invention therefore comprise a composition containing a component (a) and a component (b) as aforesaid, a photoinitiator if necessary, and a heat-activated free-radical catalyst, and a process for curing such a composition comprising partially polymerising it by exposing it to actinic radiation and then heating it to activate the heat-activated free-radical catalyst.

Thus, a film of a liquid composition may be irradiated to an extent sufficient to cause the composition to solidify and form a film adhesive but not to an extent sufficient to complete polymerisation. The film adhesive may then be sandwiched between two substrates and heated to activate the free-radical catalyst contained in the composition and to complete the cure. Or the film adhesive may be applied to a layer of reinforcing fibers and caused to flow about the fibers by the application of pressure and the impregnated structure may be formed into a desired shape, or stacked with other such layers, and then the impregnated structure or structures is or are heated to activate the free-radical catalyst.

Or reinforcing fibers may be directly impregnated with such a composition in liquid form, the fibers are then irradiated to cause the composition to solidify, then the article is formed into some desired shape or stacked with another such article, and then heat is applied to activate the free-radical catalyst and complete the cure.

Another application comprises dip-coating an article in such a liquid composition, irradiating it to cause the adhering coating to polymerise, and then heating the article to activate a free-radical catalyst contained therein and so complete the cure.

A further application comprises forming a hollow shaped article by a filament winding process which involves impregnating a continuous tow of a reinforcing fiber with such a composition and winding the tow around a mandrel while exposing the winding to actinic radiation, removing the winding, and then heating it to activate the free-radical catalyst to complete the cure. Such a winding, before heating, has greater flexibility than one cured in situ and so may be removed from the mandrel more easily.

Yet a further application comprises the production of sheet moulding compositions, wherein reinforcing fibers are coated with such a liquid composition, then they are formed into layers and irradiated, directly and, if required, through supporting sheets partially to polymerise the composition, and finally the composition is heated to cure it after it has been formed into some desired shape.

Compositions of the invention may be marketed in two component packs, one containing component (a) and the other component (b). Otherwise, they may be stored until required as mixtures, protected from actinic radiation and sources of free radicals.

The following Examples illustrate the invention. Parts are by weight and temperatures are in degrees Celsius.

Flexural strengths are the mean of three results and were determined according to British Standard No. 2782, Method 304B. Lap shear strengths are also the mean of three results, and were determined according to the British Ministry of Aviation Aircraft Specification DTD 5577, of November 1965.

2,2-Bis(3-allyl-4-hydroxyphenyl)propane, used as an intermediate, was prepared as described in published British Patent Application No. 2 012 780 A.

Bis(3-allyl-4-hydroxyphenyl)methane and 3,3'-diallyl-4,4'-dihydroxydiphenyl can be prepared in the same way, from bis(4-hydroxyphenyl)methane and 4,4'-dihydroxydiphenyl, respectively.

The preparation of 2,2-bis(3-(1-propenyl)-4-hydroxyphenyl)propane is also described in published British Patent Application No. 2 102 780 A.

2,2-Bis(3,5-diallyl-4-hydroxyphenyl)propane was prepared by conversion of 2,2-bis(3-allyl-4-hydroxyphenyl)propane into its diallyl ether and subjecting this to a Claisen rearrangement as described in published British Patent Application No. 2 012 780 A. Its allyl double bond content was 10.3 equiv./kg.

Similar rearrangement of 1,3-diallyloxybenzene afforded a mixture of the two isomeric substituted resorcinols, 1,3-diallyl-2,4-dihydroxybenzene and 1,5-diallyl-2,4-dihydroxybenzene. The mixture had an allylic double bond content of 10.53 equiv./kg.

Preparation of
2,2-bis(3-allyl-4-(3-(methacryloyloxy)-2-hydroxypropoxy)phenyl)propane Procedure I A mixture of 103 g of 2,2-bis(3-allyl-4-hydroxyphenyl)propane and 95 g of glycidyl methacrylate (i.e., 2 molar proportions) containing 0.8 g of 2,6-di-tert. butyl-p-cresol and 0.4 g of tetramethylammonium chloride was heated to 110° over 1 hour and heated at the temperature for a further 3½ hours, at which time the epoxide content of the mixture was negligible. The product was substantially of the formula

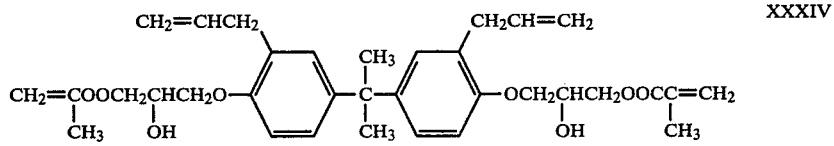

XXXIV

Procedure II 2,2-Bis(3-allyl-4-(glycidyloxy)phenyl)propane, of epoxide content 4.7 equiv./kg, (82 g) was heated to 100° in the presence of tetramethylammonium chloride (0.35 g) and 2,6-di-tert. butyl-p-cresol (0.23 g). Methacrylic acid (34 g, i.e., 2 molar proportions) was added dropwise over 1 hour, and the mixture was stirred for a further 3½ hours at 100°, at which time the epoxide content of the mixture was negligible. There remained the product, substantially of formula XXXIV, as a liquid of viscosity 108 Pa-s.

Preparation of 2,2-bis(3-allyl-4-(methylacryloyloxy)phenyl)propane

To a stirred mixture of 68.5 g of the disodium salt of 2,2-bis(3-allyl-4-hydroxyphenyl)propane, 250 ml of toluene, and 0.12 g of 2,6-di-tert. butyl-p-cresol was added dropwise over 1 hour 40.3 g of methacryloyl chloride, the temperature of the mixture being kept below 45° during the addition. After the mixture had been stirred for a further 2½ hours, it was filtered and the filtrate was freed of solvent by subjecting it to vacuum (water pump) and then high vacuum. There remained in practically quantitative yield the desired product, having the formula

XXXV as a nearly colourless liquid of viscosity 3.6 Pa-s.

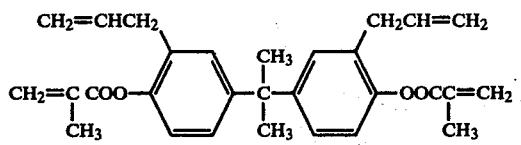

Preparation of 1-(allyloxycarbonyl)-2,4- and -2,5-bis(3-(methylacryloyloxy)-2-hydroxypropoxycarbonyl)benzene A mixture of recrystallised trimellitic anhydride (57.6 g) and allyl alcohol (175 g) was heated under reflux for 4½ hours, then the excess of allyl alcohol was distilled off under reduced pressure to leave 74.5 g of the monoallyl esters of benzene-1,2,4-tricarboxylic acid as a white solid.

The mixture of allyl 2,4-dicarboxybenzoate and allyl 2,5-dicarboxybenzoate so obtained (50 g) was heated with 57 g of glycidyl methacrylate (2 mol) in the presence of 0.17 g of trimethylammonium chloride and 0.2 g of 2,6-di-tert. butyl-p-cresol for 12 hours at 60° to afford a mixture of the compounds of formula

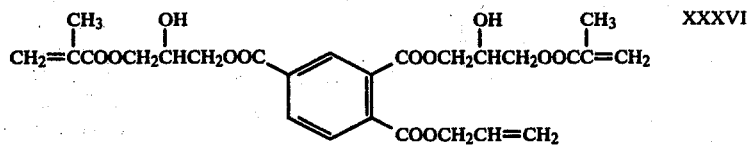

XXXVI and

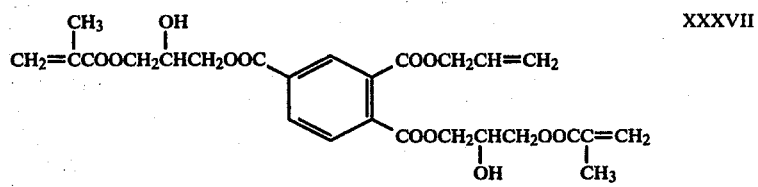

XXXVII

Preparation of 2,2-bis(3,5-diallyl-4-(3-methacryloyloxy)-2-hydroxypropoxy)phenyl)propane A mixture of 2,2-bis(3,5-diallyl-4-hydroxyphenyl)propane (194 g), glycidyl methacrylate (154 g), tetramethylammonium chloride (0.7 g), and 2,6-di-tert. butyl-p-cresol (2.8 g) was heated to 95° over 1 and stirred at that temperature for a further 3.5 hour to furnish the compound of formula

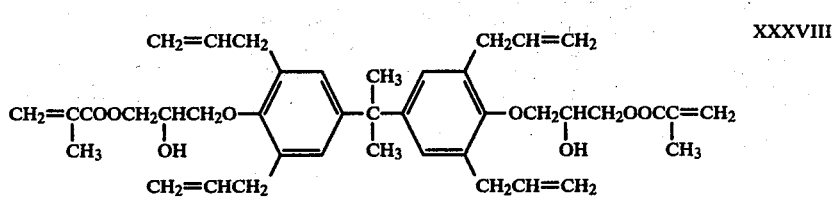

XXXVIII

Preparation of 2,2-bis(3-(1-propenyl)-4-(3-(methacryloyloxy)-2-hydroxypropoxy)phenyl)propane A mixture of 2,2-bis(3-(1-propenyl)-4-(glycidyloxy)phenyl)propane (49.2 g), tetramethylammonium chloride (0.1 g), and hydroquinone (0.15 g) was heated to 80°, then methacrylic acid (20.4 g) was added dropwise over 1.5 hours. The mixture was stirred for a further 8 hours at 80° to afford the compound of formula

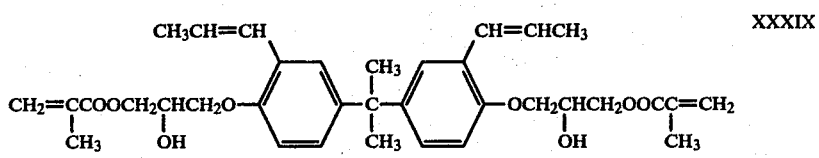

XXXIX

Preparation of 1,3- and 1,5-diallyl-2,4-bis(3-(methacryloyloxy)-2-hydroxypropoxy)benzene A mixture (85 g) of 1,3-diallyl-2,4-dihydroxybenzene and 1,5-diallyl-2,4-dihydroxybenzene was heated over 1 hour to 100° with 127 g of glycidyl methacrylate, 0.8 g of 2,6-di-tert.butyl-p-cresol, and 0.4 g of tetramethylammonium chloride, and the whole was stirred at that temperature for a further 5 hours, to yield a mixture of the compounds of formula

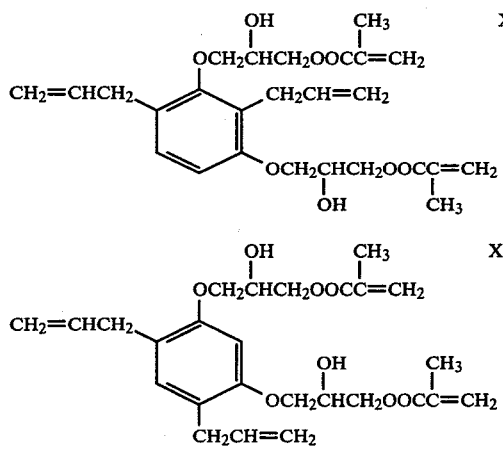

Preparation of an advanced resin ("Resin A")

1,3-Diglycidyl-5,5-dimethylhydantoin (100 g) was advanced by heating with 94.75 g of 2,2-bis(3-allyl-4-hydroxyphenyl)propane in 195 g of cyclohexanone containing 0.6 g of tetramethylammonium chloride for 6 hours at 120°. The epoxide content of the mixture fell at the end of the 6 hours to 1.0 equiv./kg. The intermediate is substantially of formula XLll, where X and Y each denote a glycidyl group and x is a positive integer. After the mixture had been cooled to 80°, 0.4 g of 2,6-ditert. butyl-p-cresol was added, followed by, dropwise over 20 minutes, 17.2 g of methacrylic acid. The mixture was then heated at 100° for 6 hours, reaction being halted at this stage, when the epoxide content of the resin had fallen to 0.29 equiv./kg. The product, "Resin A", is substantially a mixture of the formula XL11 solution of 2.05 g of tetramethylammonium chloride in 2.05 ml of water was added, and the whole was stirred at 95° for 3 hours. The mixture was cooled to 55° to 60°, and a further quantity of tetramethylammonium chloride (1.71 g) dissolved in 1.71 ml of water was added. Under a partial vacuum the mixture was brought to reflux at 55° to 57° in an apparatus providing from continual removal of water from the mixture. A 50% aqueous solution (180 g) of sodium hydroxide was added dropwise with stirring over 2½ hours, then stirring was continued for a further 1½ hours. The mixture was cooled, the vacuum was released, then water (340 ml) was added, the mixture was separated, and the organic layer was washed, first with a 5% aqueous solution (223 ml) of sodium dihydrogen orthophosphate and then with 223 ml of water. The excess of epichlorohydrin was distilled off under reduced pressure to leave 450 g of benzophenone-3,4,3',4'-tetracarboxylic acid X,X'-diallyl esters Y,Y'-diglycidyl esters as a viscous oil having an epoxide content of 3.1 equiv./kg.

The diallyl esters-diglycidyl esters (200 g) were heated to 120° in the presence of 0.6 g of tetramethylammonium chloride and 0.4 g of 2,6-di-tert.butyl-p-cresol, and methacrylic acid (52.6 g) was added dropwise over 35 minutes. Stirring was continued for a further 35 minutes and then the mixture was allowed to cool. The desired product (i.e., that of formula XXI, where one of $R^7$ and $R^8$, and one of $R^9$ and $R^{10}$, each denote an allyl group and each of the two remaining symbols of $R^7$ to $R^{10}$ denotes a group of formula XX, where R represents a methyl group and $R^6$ a group of formula (I) was a light yellow, viscous oil.

The polymercaptans employed were commercially-available materials, having the following thiol contents:

| Polymercaptan | SH-Equiv./kg |
|---|---|
| Pentaerythritol tetrathioglycollate | 8.8 |
| 1,8-Dimercapto-3,6-dioxa-octane | 10.6 |
| Trimethylolpropane trithioglycollate | 8.0 |
| Ethylene glycol dithioglycollate | 9.05 |

Preparation of benzophenone-3,4,3',4'-tetracarboxylic acid X,X'-diallyl esters Y,Y'-bis(3-(methacryloyloxy)-2-hydroxypropyl) esters Benzophenone-3,4,3',4'-tetracarboxylic acid dianhydride (400 g; recrystallised from acetic anhydride) and 1200 g of allyl alcohol were refluxed for 1 hour, then the excess of allyl alcohol was removed by vacuum distillation to leave 540 g of benzophenone-3,4,3',4'-tetracarboxylic acid X,X'-diallyl esters.

These diallyl esters (450 g) were dissolved in 1200 g of epichlorohydrin, the mixture was heated to 95°, a where a proportion of the groups X and Y indicate 3-(methacryloyloxy)-2-hydroxypropyl groups and the remainder of X and Y indicate glycidyl groups.

EXAMPLE 1

2,2-Bis(3-allyl-4-(3-(methacryloyloxy)-2-hydroxypropoxy)phenyl)propane, prepared by procedure I, (78 parts) was mixed with 30 parts of pentaerythritol tetrathioglycollate (i.e., 1 mercaptan group equiv. per allyl group) and with 3 parts of benzil dimethyl acetal. A film 10 μm thick of this composition was drawn on tinplate and exposed at 8 cm. distance to irradiation from a medium pressure mercury arc lamp (80 w per cm). After two seconds' exposure a tough film was obtained which withstood a standard test for resistance to solvents, i.e., it was not affected by rubbing twenty times with a cotton wool swab soaked in acetone.

The same results were obtained using 2,2-bis(3-allyl-4-(3-(methacryloyloxy)-2-hydroxypropoxy)phenyl)propane prepared by procedure II.

EXAMPLE 2

A further portion of the composition prepared in Example 1 was applied as a layer 10 μm deep on a glass plate 1 mm thick. Another glass plate was placed on top of the first, and the assembly was exposed at 8 cm. distance to irradiation from the same lamp as used in Example 1 for 5 seconds. The glass plates were securely bonded together, even after being immersed in boiling water for 2 hours.

EXAMPLE 3

2,2-Bis(3-allyl-4-(3-(methacryloyloxy)-2-hydroxypropoxy)phenyl)propane, prepared by procedure II, (17 parts) was mixed with 5.4 parts of 3,6-dioxa-1,8-dimercapto-octane (i.e., 1 mercaptan group equiv. per allyl group) and with 0.75 part of benzil dimethyl acetal. A layer 10 μm thick of the composition was drawn on tinplate and irradiated as in Example 1. After irradiation for 2 seconds a tack-free, solvent-resistant film was obtained.

EXAMPLE 4

A composition was prepared as in Example 3 except that the 3,6-dioxa-1,8-dimercapto-octane was replaced by 7 parts of trimethylolpropane trithioglycollate (i.e., 1 mercaptan group equiv. per allyl group), and the layer was irradiated for 4 seconds. A glossy, solvent-resistant film was obtained.

EXAMPLE 5

Portions of the compositions prepared in Examples 1, 3, and 4 were applied to strips of aluminum foil (Alclad 3L73 aluminum alloy: 'Alclad' is a Trade Mark) which had been degreased in trichloroethylene and pickled in chromic acid solution. Thin glass sheets were primed with a 5% solution of 3-(glycidyloxy)propyltrimethoxysilane in a 9:1 by volume mixture of industrial methylated spirits and water, placed to cover the compositions, and then the assemblies were exposed to irradiation for 5 seconds from a medium pressure mercury lamp (80 w per cm). In each case the glass sheets became securely bonded to the aluminum strip.

EXAMPLE 6

A mixture of 2,2-bis(3-allyl-4-(methacryloyloxy)-phenyl)propane (100 parts), pentaerythritol tetrathioglycollate (51 parts, i.e., 1 mercaptan group equiv. per allyl group), and 4.5 parts of benzil dimethyl acetal was applied as a film μm thick onto tinplate. After irradiation for 15 seconds as in Example 1 a tough, solvent-resistant film was obtained.

EXAMPLE 7

A mixture comprising 85 parts of 2,2-bis(3-allyl-4-(3-(methacryloyloxy)-2-hydroxypropoxy)phenyl)propane (prepared by procedure II), 32.7 parts of pentaerythritol tetrathioglycollate (i.e., 1 mercaptan group equiv. per allyl group), and 3.5 parts of 2,2'-azobis(2-methylpropionitrile) was applied as a coating at room temperature on a nylon carrier film. The film was sandwiched between two sheets of 'Alclad 3L73' aluminum alloy sheets that had been degreased with trichloroethylene and pickled in chromic acid solution. Overlap joints (1.27 cm) were prepared by heating the assembly at 90° for 5 minutes and then pressing at 120° for 1 hour under a pressure of 0.34 MN/m$^2$. The lap shear strength of the joints at room temperature was 8.2 MN/m$^2$.

EXAMPLE 8

The procedure of Example 7 was repeated, employing a mixture of 100 parts of 2,2-bis(3-allyl-4-(3-(methacryloyloxy)-2-hydroxypropoxy)phenyl)propane (prepared by Procedure II), 42 parts of trimethylolpropane trithioglycollate (i.e., 1 mercaptan group equiv. per allyl group) and 4.5 parts of 2,2'-azobis(2-methylpropionitrile). The lap shear strength at room temperature of the joints was 19.4 MN/m$^2$.

EXAMPLE 9

A composition comprising 100 parts of a mixture of 1-allyloxycarbonyl-2,4-bis(3-(methacryloyloxy)-2-hydroxypropoxycarbonyl)benzene and 1-allyloxycarbonyl-2,5-bis(3-methacryloyloxy)-2-hydroxypropoxycarbonyl)benzene, prepared as described above, 21 parts of pentaerythritol tetrathioglycollate (i.e., 1 mercaptan group equiv. per allyl group), and 3.5 parts of benzil dimethyl acetal was irradiated in the form of a film 10 μm thick as described in Example I.

A solvent-resistant film was produced after irradiation for 5 seconds.

EXAMPLE 10

Glasscloth (plain weave) was impregnated with a liquid composition comprising 26 parts of 2,2-bis(3-allyl-4-(3-(methacryloyloxy)-2-hydroxypropoxy)-phenyl)propane (prepared by procedure II), 10 parts of pentaerythritol tetrathioglycollate (i.e., 1 mercaptan group equiv. per allyl group), 1 part of benzophenone, and 1 part of 2,2'-azobis(2-methylpropionitrile). The impregnated cloth was exposed on both sides to irradiation from an 80 w per cm medium pressure mercury arc lamp at a distance of 8 cm for 1 second. A six-ply laminate was made by pressing 16 cm-square pieces of the prepreg at 120° for 1 hour under a pressure of 2.1 MN/m$^2$. The laminate, which contained 57% of glass, had a flexural strength at room temperature of 354 MN/m$^2$.

EXAMPLE 11

A liquid composition comprising 100 parts of 2,2-bis(3-allyl-4-(3-(methacryloyloxy)-2-hydroxypropoxy)-phenyl)propane (prepared by Procedure II), 42 parts of trimethylolpropane trithioglycollate, (i.e., 1 mercaptan group equiv. per allyl group), 4.5 parts of benzil dimethyl acetal, and 4.5 parts of 2,2'-azobis(2-methylpropionitrile) was applied as a coating on a nylon carrier film at room temperature. Irradiation on both sides for 1 second under an 80 w per cm medium pressure mercury arc lamp at a distance of 1 cm. resulted in formation of a tack-free film. The film was cut to size and sandwiched between two sheets of aluminium alloy that had been degreased in trichloroethylene and pickled in chromic acid solution. Overlap joints (1.27 cm) were prepared by pressing the assembly under a pressure of 0.34 MN/m$^2$ for 1 hour at 120°. The lap shear strength at room temperature of the joints was 6.7 MN/m$^2$.

EXAMPLE 12

A mixture of 2,2-bis(3,5-diallyl-4-(3-(methacryloyloxy)-2-hydroxypropoxy)phenyl)propane (10 parts), pentaerythritol tetrathioglycollate (8.6 parts, i.e., 1 mercaptan group equiv. per allyl group), and benzil dimethyl acetal (0.5 part) was applied as a film 10 μm thick on tinplate and exposed to irradiation as in Example 1. A tack-free, solvent-resistant film was obtained after irradiation for 5 seconds.

EXAMPLE 13

A thermally-curable composition comprising 2,2-bis(3,5-diallyl-4-(3-(methacryloyloxy)-2-hydroxypropoxy)phenyl)propane (50 parts), pentaerythritol tetrathioglycollate (43 parts, i.e., 1 mercaptan group equiv. per allyl group) and 2,2-azobis(2-methylpropionitrile) (2.8 parts) was employed to make overlap joints as described in Example 7. The lap shear strength at room temperature of the joints was 24.7 MN/m$^2$.

EXAMPLE 14

To a composition prepared as described in Example 13 was added 2.8 parts of benzil dimethyl acetal and overlap joints were prepared as described in Example 11. The lap shear strength of the joints at room temperature was 17.9 MN/m$^2$.

EXAMPLE 15

A composition comprising 26 parts of 2,2-bis(3-(1-propenyl)-4-(3-(methacryloyloxy)-2-hydroxypropoxy)-phenyl)propane, 10 parts of pentaerythritol tetrathioglycollate (i.e., 1 mercaptan group equiv. per propenyl group), and 1 part of benzil dimethyl acetal was irradiated as a film 10 μm thick on tinplate as described in Example 1, a solvent-resistant, tack-free film being obtained after 5 seconds' irradiation.

EXAMPLE 16

A composition comprising 52 parts of 2,2-bis(3-(1-propenyl)-4-(3-(methacryloyloxy)-2-hydroxypropoxy)-phenyl)propane, 20 parts of pentaerythritol tetrathioglycollate (i.e., 1 mercaptan group equiv. per allyl group), and 2.2 parts of 2,2'-azobis(2-methylpropionitrile) was employed to make overlap joints as in Example 7. The lap shear strength of the joints was 11.5 MN/m$^2$.

EXAMPLE 17

A composition comprising 10 parts of mixed 1,3-diallyl-2,4-bis(3-(methacryloyloxy)-2-hydroxypropoxy)-benzene and 1,5-diallyl-2,4-bis(3-(methacryloyloxy)-2-hydroxypropoxy)benzene, 6.8 parts of pentaerythritol tetrathioglycollate (i.e., 1 mercaptan group equiv. per allyl group), and 0.6 part of benzil dimethyl acetal was applied to tinplate and irradiated as described in Example 1. A solvent-resistant coating was obtained after irradiation for 5 seconds.

The experiment was repeated, using in place of the pentaerythritol tetrathioglycollate 6.65 parts (i.e., 1 mercaptan group equiv. per allyl group) of ethylene glycol dithioglycollate. Similar results were obtained.

EXAMPLE 18

A composition comprising 20 parts of Resin A, 3.3 parts of pentaerythritol tetrathioglycollate, and 0.39 part of benzil dimethyl acetal was applied as a coating onto a copper-clad laminate and the solvent was allowed to evaporate, leaving a film about 10 μm thick. This film was irradiated for 10 minutes through a negative using a 500 w medium pressure mercury arc lamp at a distance of 22 cm. After irradiation the image was developed in a mixture of 10 parts by volume of acetone and 90 parts by volume of xylene, washing away the unexposed areas to leave a good relief image on the copper. The uncoated copper areas were then etched using an aqueous solution of ferric chloride (41% FeCl$_3$) at 35°, leaving the coated areas intact.

EXAMPLE 19

Benzophenone-3,4,3',4'-tetracarboxylic acid X,X'-diallyl esters Y,Y'-bis(3-methacryloyloxy)-2-hydroxypropyl esters (32.5 parts) were mixed with 11.5 parts of pentaerythritol tetrathioglycollate (i.e., 1 mercaptan group equiv. per allyl group). A film 10 μm thick of this composition was drawn on tinplate and exposed at 8 cm. distance to irradiation from a medium pressure mercury arc lamp (80 w per cm). After four seconds' exposure a tough film was obtained which withstood a standard test for resistance to solvents, i.e., it was not affected by rubbing twenty times with a cotton wool swab soaked in acetone.

EXAMPLE 20

The procedure of Example 19 was repeated, employing 100 parts of the diallyl-dimethacryloyl compounds and 35 parts of trimethylolpropane trithioglycollate (i.e., 1 mercaptan group per allyl group). A tack-free, solvent-resistant film was produced after irradiation for only two seconds.

EXAMPLE 21

The procedure of Example 19 was repeated, employing 100 parts of the diallyl-dimethacryloyl compounds and 26 parts of 1,8-dimercapto-3,6-dioxa-octane (i.e., one mercaptan group equiv. per allyl group). A tack-free, solvent-resistant film was obtained on irradiation for five seconds.

EXAMPLE 22

A further portion of the composition prepared in Example 19 was applied as a layer 10 μm deep on a glass plate 1 mm thick. Another glass plate was placed on top of the first, and the assembly was exposed at 8 cm. distance to irradiation from the same lamp as used in Example 1 for 5 seconds. The glass plates were securely bonded together.

EXAMPLE 23

Portions of the compositions prepared in Examples 19 and 20 were applied to strips of aluminum foil (Alclad 3L73 aluminum alloy) which had been degreased in trichloroethylene and pickled in chromic acid solution. Thin glass sheets were primed with a 5% solution of 3-(glycidyloxy)propyltrimethoxysilane in a 9:1 by volume mixture of industrial methylated spirits and water, placed to cover the compositions, and then the assemblies were exposed to irradiation for 5 seconds from a medium pressure mercury lamp (80 w per cm). In each case the glass sheets became securely bonded to the aluminum strip.

What is claimed is:

1. A polymerizable composition comprising
    (a) a compound containing in the molecule both
        (i) at least one group chosen from acryloyloxy and methacryloyloxy groups, said acryloyloxy or methacryloyloxy group in compound (a) being attached to a carbon atom of an aromatic nucleus, directly or through the (terminal) ether oxygen atom of a group of formula

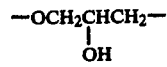   I or

   II where
R denotes a hydrogen atom or a methyl group and a is an integer of from 1 to 6, and
(ii) at least one group chosen from allyl, methallyl, and 1-propenyl groups, which allyl, methallyl or 1-propenyl group is attached directly to a carbon atom which forms part of an aromatic nucleus, to an oxygen atom or to an oxycarbonyl group which oxygen or oxycarbonyl is in turn directly attached to such a carbon atom,
the total of the said groups (i) and (ii) being at least three, or
in which compound (a) is of the formula

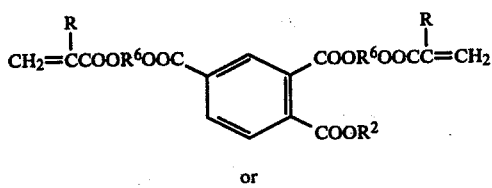   XVI or

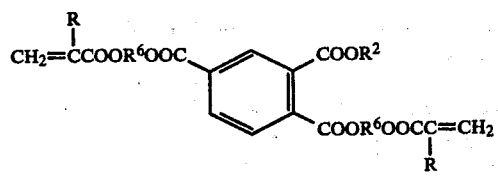   XVII where each $R^6$ denotes a group of formula

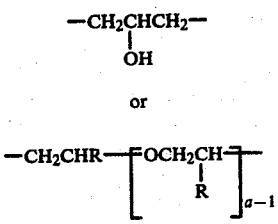

wherein R denotes a hydrogen atom or a methyl group and a is an integer of from 1 to 6, and each $R^2$ denotes an allyl, methallyl, or 1-propenyl group, or in which compound (a) is of the formula

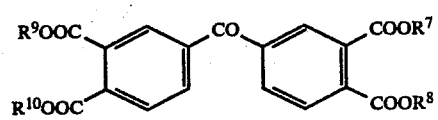   XIX where one of $R^7$ and $R^8$, and one of $R^9$ and $R^{10}$, have the same meaning and each denotes an allyl or methallyl group, and each of the remaining symbols of $R^7$ and $R^8$, and $R^9$ and $R^{10}$, represent a group of formula

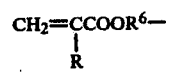   XX where R and $R^6$ are defined as above, and
(b) a compound containing, per molecule, at least two mercaptan groups directly attached to aliphatic carbon atoms, in a proportion such as to supply at least 0.8 such mercaptan group per group selected from allyl, methallyl, and 1-propenyl groups in (a) but less than 1.0 such mercaptan group per group selected from acryloyl, methacryloyl, allyl, methallyl, and 1-propenyl groups in (a).

2. A composition according to claim 1, in which component (a) contains at least two and at most six groups chosen from acryloyloxy and methacryloyloxy groups per molecule.

3. A composition according to claim 1, in which component (a) contains at least two and at most fifteen groups chosen from allyl, methallyl, and 1-propenyl groups per molecule.

4. A composition according to claim 1, in which component (a) is a polyhydric phenol, at least two phenolic hydroxyl groups of which are esterified with groups chosen from acryloyl and methacryloyl groups, either directly or through the (terminal) ether oxygen atom of a group of formula

—OCH$_2$CHCH$_2$—   I
  |
  OH or

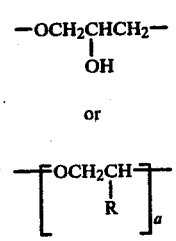   II where
R denotes a hydrogen atom or a methyl group and a is an integer of from 1 to 6,
and either at least two phenolic hydroxyl groups of which are directly etherified with groups chosen from allyl, methallyl, and 1-propenyl groups, or the said polyhydric phenol is substituted directly on carbon atoms in a benzene or naphthalene nucleus or nuclei thereof by at least two groups selected from allyl, methallyl and 1-propenyl groups.

5. A composition according to claim 1, in which component (a) is selected from the compounds of formula

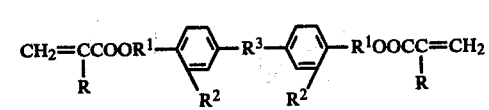   III

-continued

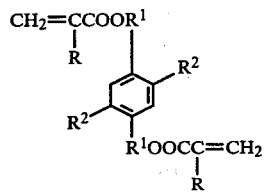 IV

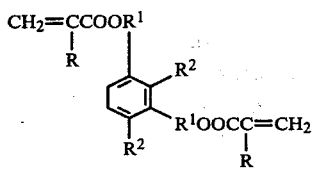 V

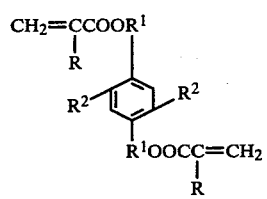 VI

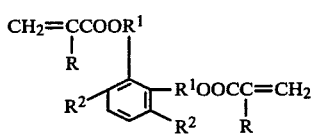 VII

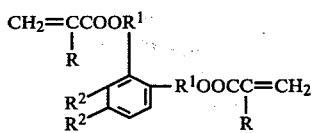 VIII

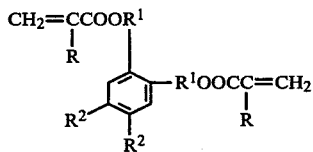 IX

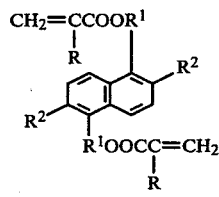 X

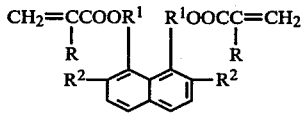 XI

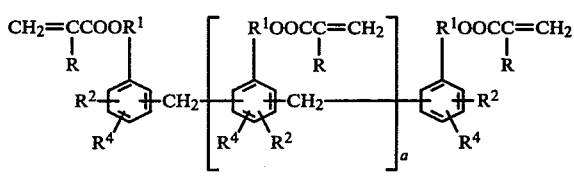 XII

-continued

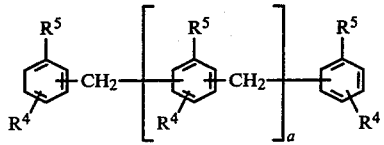 XIII

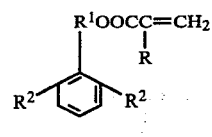 XIV or

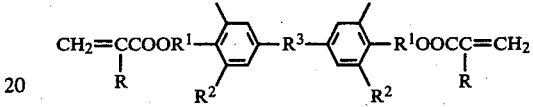 XV where
R denotes a hydrogen atom or a methyl group,
a is an integer of from 1 to 6,
each $R^1$ denotes an oxygen-carbon bond or a group of formula

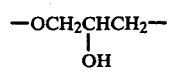 I or

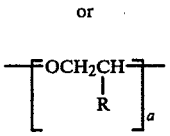 II each $R^2$ denotes an allyl, methallyl, or 1-propenyl group,
$R^3$ denotes a carbon-carbon bond, an alkylene or alkylidene group of up to 5 carbon atoms, an ether oxygen atom, a sulfur atom, or a group of formula —CO—, —SS—, —SO—, or —SO$_2$—,
each $R^4$ denotes a hydrogen, chlorine, or bromine atom, or an alkyl group of 1 to 4 carbon atoms, and
each $R^5$ denotes a group of formula $CH_2$=C(R)COOR$^1$— or an allyloxy, methallyloxy, or 1-propenyloxy group, such that at least one denotes a said group of formula $CH_2$=C(R)COOR$^1$— and at least two each denote an allyloxy, methallyloxy, or 1-propenyloxy group, with the proviso that, in formulae XII and XIII, each —CH$_2$— and $R^2$-group shown is ortho or para to an indicated group $CH_2$=C(R)COOR$^1$— and $R^5$—.

6. A composition according to claim 1, in which component (a) is of the formula

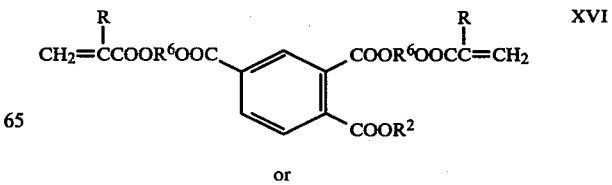 XVI or

-continued

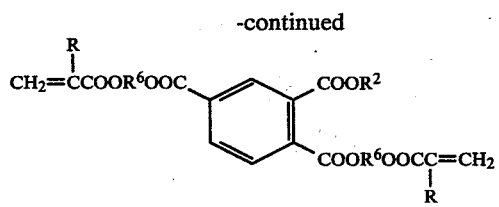
XVII where each $R^6$ denotes a group of formula

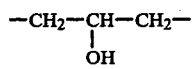
I or $-CH_2CHR-[OCH_2CHR]_{a-1}-$  II wherein R denotes a hydrogen atom or a methyl group and a is an integer of from 1 to 6, and each $R^2$ denotes an allyl, methallyl, or 1-propenyl group.

7. A composition according to claim 1, in which component (a) is of the formula

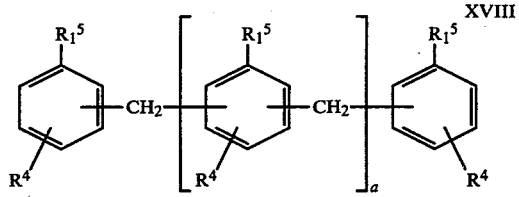
XVIII where each $R_1^5$ denotes a group of formula $CH_2=C(R)COOR^1-$ or an allyloxy, methallyloxy, or 1-propenyloxy group such that at least two denote a said group of formula $CH_2=C(R)COOR^1-$ and one denotes an allyloxy, methallyloxy, or 1-propenyloxy group, the $-CH_2-$ groups being ortho or para to a group $R_1^5$, wherein R denotes a hydrogen atom or a methyl group, and $R^1$ denotes an oxygen-carbon bond or a group of formula

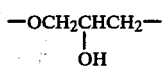
I or

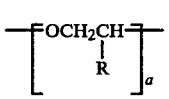
II and each $R^4$ denotes a hydrogen, chlorine, or bromine atom, or an alkyl group of 1 to 4 carbon atoms.

8. A composition according to claim 1, in which component (a) is of the formula

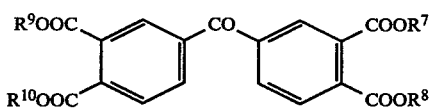
XIX where
one of $R^7$ and $R^8$, and one of $R^9$ and $R^{10}$, have the same meaning and each denotes an allyl or methallyl group, and each of the remaining symbols of $R^7$ and $R^8$, and of $R^9$ and $R^{10}$, denotes the residue of an alcohol after removal of the hydrogen atom or an alcoholic hydroxyl group, said residue containing an acryloyloxy or methacryloyloxy group.

9. A composition according to claim 8, wherein each of the remaining symbols of $R^7$ and $R^8$, and $R^9$ and $R^{10}$, represent a group of formula

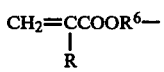
XX where
R denotes a hydrogen atom or a methyl group, and $R^6$ denotes a group of formula

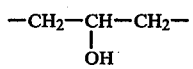
I or $-CH_2CHR-[OCH_2CHR]_{a-1}-$  II wherein a is an integer of from 1 to 6.

10. A composition according to claim 1, wherein component (b) is an ester of a monomercaptanalkylenecarboxylic acid with a polyhydric alcohol or of an aliphatic monomercaptanmonohydric alcohol with a polycarboxylic acid.

11. A composition according to claim 1, wherein component (b) is of one of the formulae

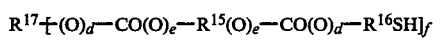
XXV

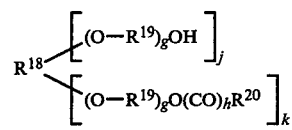
XXVI

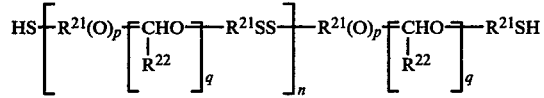
XXIX

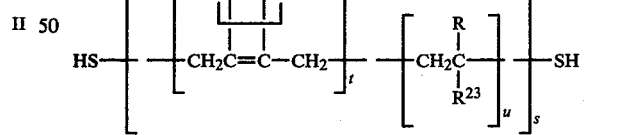
XXX

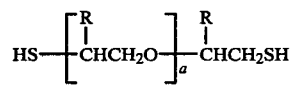
XXXII or

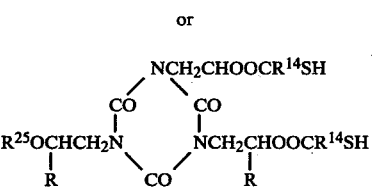
XXXIII where a and f are each independently an integer of from 1 to 6, d and e each represent zero but are not the same, g is a positive integer, h is zero or 1, j is zero or a positive integer such that (j+k) is at most 6, k is an integer of from 2 to 6, n is an integer which has an average value of at least 1, either p is zero, in which case q and r are each also zero, or p is 1, in which case q is zero and r is 1, s is an integer of more than one, t is an integer of at least one, and u is zero or a positive integer, each R denotes a hydrogen atom or a methyl group, $R^{14}$ denotes $-CH_2-$, $-(CH_2)_2-$, or $-CH(CH_3)-$, $R^{15}$ represents a divalent organic radical, linked through a carbon atom or carbon atoms thereof to the indicated $-O-$ or $-CO-$ units, $R^{16}$ represents a divalent organic radical, linked through a carbon atom or carbon atoms thereof to the indicated $-SH$ group and $-O-$ or $-CO-$ unit, $R^{17}$ represents an organic radical, which must contain at least one aliphatic $-SH$ group when f is 1, linked through a carbon atom or carbon atoms thereof to the indicated $-O-$ or $-CO-$ unit or units, $R^{18}$ represents the radical of a polyhydric alcohol after removal of (j+k) alcoholic hydroxyl groups, each $R^{19}$ denotes an alkylene group containing a chain of at least 2 and at most 6 carbon atoms between the indicated consecutive oxygen atoms, $R^{20}$ represents an aliphatic radical of 1 to 6 carbon atoms, each $R^{21}$ denotes an alkylene hydrocarbon group containing from 2 to 4 carbon atoms, $R^{22}$ denotes a hydrogen atom or a methyl or ethyl group, $R^{23}$ represents $-CN$, $-COOH$, $-CONH_2$, $-COOR^{24}$, $-C_6H_5$, or $COOR^{24}$, where $R^{24}$ is an alkyl group of one to eight carbon atoms, and $R^{25}$ denotes a group $-OCR^{14}SH$ or a hydrogen atom.

12. A process for the polymerisation of a composition as claimed in claim 1 which comprises exposing it, in the presence of a photoinitiator if required, to actinic radiation.

13. A process for polymerisation of a composition as claimed in claim 1 which comprises exposing, it to the effect of a heat-activated free-radical catalyst.

14. A process for the polymerisation of a composition as claimed in claim 1, which contains, if required, a photoinitiator, and which also contains a heat-activated free-radical catalyst, comprising partially polymerising it by exposing it to actinic radiation and then heating it to activate the heat-activated free-radical catalyst.

* * * * *